United States Patent
Oda et al.

(10) Patent No.: US 10,132,325 B2
(45) Date of Patent: Nov. 20, 2018

(54) SEALING MECHANISM AND TURBO REFRIGERATOR

(71) Applicant: DAIKIN INDUSTRIES, LTD., Osaka-shi, Osaka (JP)

(72) Inventors: Kentarou Oda, Tokyo (JP); Nobuyoshi Sakuma, Tokyo (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 425 days.

(21) Appl. No.: 14/895,608

(22) PCT Filed: May 30, 2014

(86) PCT No.: PCT/JP2014/064416
§ 371 (c)(1),
(2) Date: Dec. 3, 2015

(87) PCT Pub. No.: WO2014/196465
PCT Pub. Date: Dec. 11, 2014

(65) Prior Publication Data
US 2016/0131150 A1    May 12, 2016

(30) Foreign Application Priority Data

Jun. 4, 2013  (JP) .................................. 2013-117738

(51) Int. Cl.
*F25D 19/00*  (2006.01)
*F04D 29/12*  (2006.01)
(Continued)

(52) U.S. Cl.
CPC ......... *F04D 29/122* (2013.01); *F04D 29/102* (2013.01); *F04D 29/624* (2013.01);
(Continued)

(58) Field of Classification Search
CPC .... F04D 29/122; F04D 29/668; F04D 29/624; F04D 29/102; F16J 15/447; F16J 15/44;
(Continued)

(56) References Cited

U.S. PATENT DOCUMENTS 4,900,165 A * 2/1990 Kun ...................... F01D 25/164
                                                              384/220
6,293,555 B1 * 9/2001 Sedy ........................ F16J 15/38
                                                              277/379
(Continued)

FOREIGN PATENT DOCUMENTS

CN     101504004 A     8/2009
JP     62-119570 U     7/1987
(Continued)

OTHER PUBLICATIONS

International Search Report, issued in PCT/JP2014/064416, dated Aug. 12, 2014.

*Primary Examiner* — Ljiljana Ciric
(74) *Attorney, Agent, or Firm* — Birch, Stewart, Kolasch & Birch, LLP

(57) ABSTRACT

A sealing mechanism (40) includes: a ring-shaped sealing body (41) which surrounds a rotating shaft (24) when viewed from an axial direction; a sealing-body support part (42) which supports the sealing body (41) so as to be movable in a radial direction of the rotating shaft (24); and an elastic member (44) which is interposed between the sealing body (41) and the sealing-body support part (42).

4 Claims, 2 Drawing Sheets

(51) Int. Cl.
  *F25B 1/053*   (2006.01)
  *F16J 15/44*   (2006.01)
  *F04D 29/10*   (2006.01)
  *F04D 29/62*   (2006.01)
  *F25B 1/10*    (2006.01)
  *F16J 15/447*  (2006.01)
  *F04D 29/66*   (2006.01)

(52) U.S. Cl.
  CPC ............ *F04D 29/668* (2013.01); *F16J 15/44* (2013.01); *F16J 15/447* (2013.01); *F25B 1/053* (2013.01); *F25B 1/10* (2013.01); *F25B 2400/13* (2013.01); *F25B 2500/22* (2013.01)

(58) Field of Classification Search
  CPC ........ F25B 1/10; F25B 1/053; F25B 2500/22; F25B 2400/13
  See application file for complete search history.

(56) References Cited

U.S. PATENT DOCUMENTS

| | | | |
|---|---|---|---|
| 2006/0062663 A1* | 3/2006 | Figura | F01D 17/165 |
| | | | 415/160 |
| 2009/0193839 A1 | 8/2009 | Tsukamoto et al. | |
| 2010/0061851 A1* | 3/2010 | Hummel | F01D 25/16 |
| | | | 415/229 |
| 2013/0341934 A1* | 12/2013 | Kawanishi | B60L 8/00 |
| | | | 290/1 A |
| 2014/0125208 A1* | 5/2014 | Yamashita | F02C 6/12 |
| | | | 310/68 B |

FOREIGN PATENT DOCUMENTS

| | | |
|---|---|---|
| JP | 8-35499 A | 2/1996 |
| JP | H10110831 A | 4/1998 |
| JP | 2004-245187 A | 9/2004 |
| JP | 2009-186028 A | 8/2009 |

* cited by examiner

SEALING MECHANISM AND TURBO REFRIGERATOR

TECHNICAL FIELD

The present invention relates to a sealing mechanism and a turbo refrigerator.

Priority is claimed on Japanese Patent Application No. 2013-117738, filed on Jun. 4, 2013, the content of which is incorporated herein by reference.

BACKGROUND ART

For example, in a turbo refrigerator which is provided with a turbo compressor having a motor and an impeller, a refrigerant is compressed by the impeller, and therefore, the impeller side has a high pressure and the motor side relatively has a low pressure. If such a pressure difference is generated, gas leaks out from the high pressure side to the low pressure side, and therefore, it is necessary to perform sealing by a sealing mechanism. However, the impeller and the motor are connected by a rotating shaft for transmitting power, and therefore, it is difficult to completely isolate the high pressure side and the low pressure side from each other.

Therefore, as shown in, for example, Patent Document 1, in general, the leakage of gas along a rotating shaft is prevented by using a non-contact type labyrinth sealing mechanism which is fixed to a housing and disposed on the circumferential surface of the rotating shaft with a slight gap therebetween.

Further, Patent Document 2 discloses a mechanism for preventing the contact between a rotating shaft and a labyrinth seal by moving the labyrinth seal with respect to the rotating shaft in a radial direction of the rotating shaft, thereby narrowing the gap between the rotating shaft and the labyrinth seal at the time of a steady operation of the rotating shaft and widening the gap at the time of the starting and stopping of the rotating shaft.

Further, Patent Document 3 discloses a mechanism for preventing the contact between a rotating shaft and a labyrinth seal by moving the labyrinth seal with respect to the rotating shaft in an axial direction of the rotating shaft, thereby narrowing the gap between the rotating shaft and the labyrinth seal at the time of a steady operation of the rotating shaft and widening the gap at the time of the starting of the rotating shaft.

CITATION LIST

Patent Document

[Patent Document 1] Japanese Unexamined Patent Application, First Publication No. 2009-186028
[Patent Document 2] Japanese Unexamined Patent Application, First Publication No. 2004-245187
[Patent Document 3] Japanese Unexamined Patent Application, First Publication No. H08-35499

SUMMARY OF INVENTION

Technical Problem

However, if a turbo refrigerator or the like which is provided with the sealing mechanism which seals the periphery of the rotating shaft, as described above, receives an external force due to an earthquake or the like, the rotating shaft comes into contact with the sealing mechanism, and thus there is a possibility that the sealing mechanism may break. For this reason, it is necessary to separate the rotating shaft and the sealing mechanism from each other so as not to come into contact with each other. However, in the related art, since the accuracy of the centering of the sealing mechanism with respect to the rotating shaft is not sufficiently high, it is necessary to take a large safety factor, and thus a large gap has to be secured between the rotating shaft and the sealing mechanism. For this reason, sealing performance by the sealing mechanism is lowered, and thus there is a tendency that the amount of gas leakage is increased.

The present invention has been made in view of the above-described circumstances and has an object to improve sealing performance in a sealing mechanism which is disposed around a rotating shaft which is installed in a turbo refrigerator or the like.

Solution to Problem

According to a first aspect of the present invention, there is provided a sealing mechanism including: a sealing-body support part which is fastened to a housing of a turbo compressor and surrounds a rotating shaft that the housing includes; a sealing body which is provided between the sealing-body support part and the rotating shaft and sandwiched between sliding surfaces of the sealing-body support part, thereby surrounding the rotating shaft; and an elastic member which is sandwiched between the sealing body and the sealing-body support part and surrounds the sealing body.

According to a second aspect of the present invention, in the first aspect, a labyrinth groove is provided in a portion facing the rotating shaft, of the sealing body.

According to a third aspect of the present invention, in the first or second aspect, the elastic member is an O-ring which surrounds the entire circumference of the sealing body when viewed from an axial direction of the rotating shaft.

According to a fourth aspect of the present invention, in the first aspect, the sealing-body support part is composed of a ring-shaped base portion which is brought into contact with the housing, and a ring-shaped cover portion, and the sealing body is sandwiched between the base portion and the cover portion.

According to a fifth aspect of the present invention, there is provided a turbo refrigerator including: a turbo compressor which has a rotating shaft connecting an impeller and a motor and performs compression of a refrigerant; a condenser which condenses the refrigerant compressed in the turbo compressor; and an evaporator which evaporates the condensed refrigerant, wherein the sealing mechanism according to the first aspect is provided as a sealing mechanism which performs sealing of a periphery of the rotating shaft of the turbo compressor.

According to a sixth aspect of the present invention, there is provided a sealing mechanism including: a ring-shaped sealing body which is fastened to a housing of a turbo compressor and surrounds a rotating shaft that the housing includes, when viewed from an axial direction; a sealing-body support part which supports the sealing body so as to be able to move in a radial direction of the rotating shaft; and an elastic member which is interposed between the sealing body and the sealing-body support part.

Advantageous Effects of Invention

According to the present invention, the sealing body surrounding the rotating shaft is supported by the sealing-body support part so as to be able to move in the radial direction of the rotating shaft, and the elastic member is interposed between the sealing body and the sealing-body support part. Such an elastic member can be flexibly deformed, and therefore, it is possible to easily adjust the position of the sealing body with respect to the rotating shaft. Accordingly, it is possible to accurately perform the centering of the sealing body with respect to the rotating shaft by the elastic member, and thus it becomes possible to make the gap between the sealing body and the rotating shaft narrower than that in the related art. Further, according to the present invention, even in a case where the rotating shaft comes into contact with the sealing body, impact due to the contact can be absorbed by the elastic member. Accordingly, it becomes possible to make the gap between the sealing body and the rotating shaft narrower than that in the related art. Therefore, according to the present invention, it becomes possible to improve sealing performance in a sealing mechanism which is disposed around a rotating shaft which is installed in a turbo refrigerator or the like.

DESCRIPTION OF EMBODIMENTS

Hereinafter, an embodiment of a turbo refrigerator according to the present invention will be described with reference to the drawings. In addition, in the following drawings, in order to show each member in a recognizable size, the scale of each member is appropriately changed.

Figure 1:
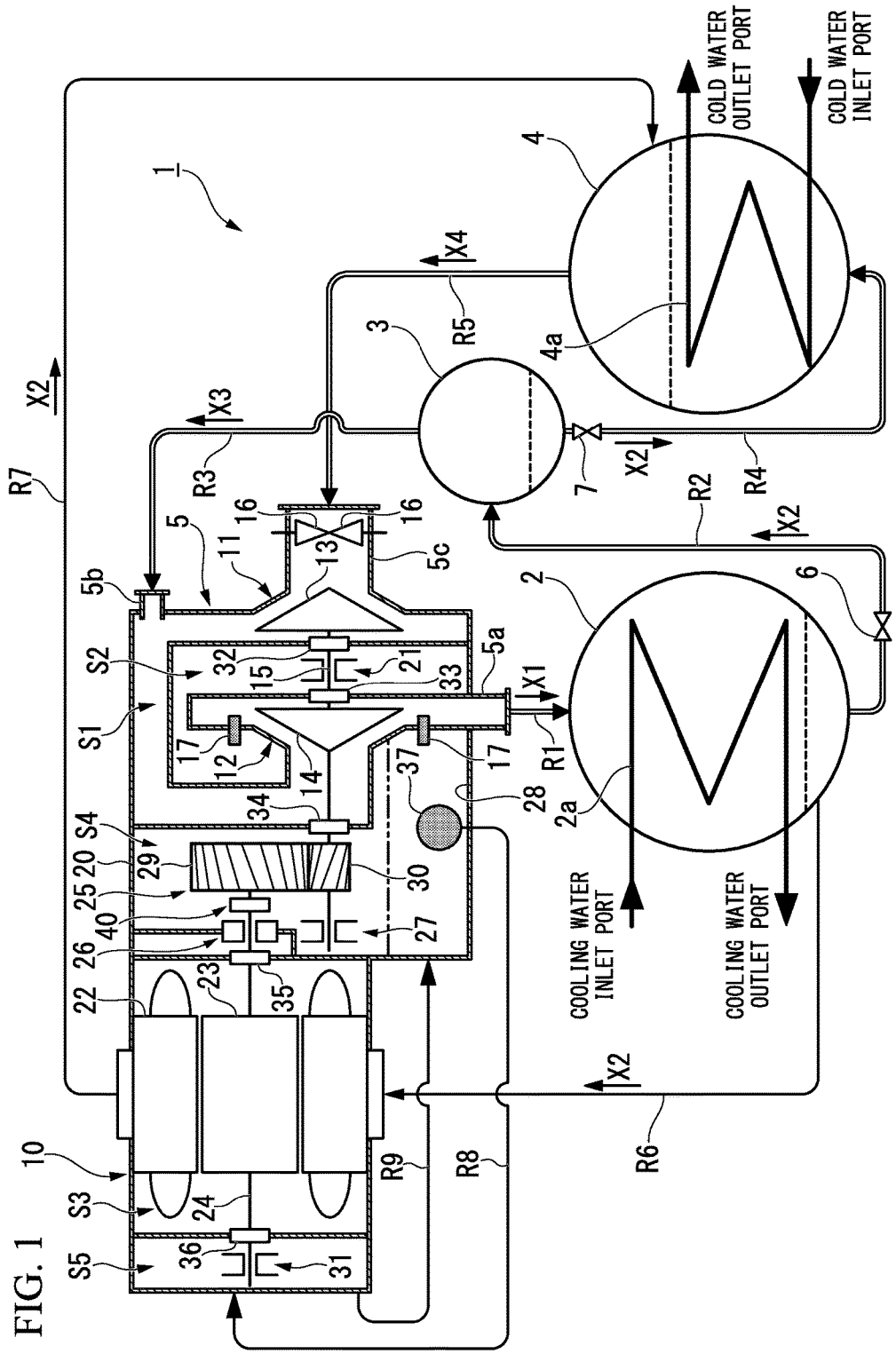
FIG. 1 is a system diagram of a turbo refrigerator in an embodiment of the present invention.

FIG. 1 is a system diagram of a turbo refrigerator 1 in an embodiment of the present invention. The turbo refrigerator 1 is provided with a condenser 2, an economizer 3, an evaporator 4, a turbo compressor 5, an expansion valve 6, and an expansion valve 7, as shown in FIG. 1.

The condenser 2 is connected to a gas discharge pipe 5a of the turbo compressor 5 through a flow path R1. A refrigerant (a compressed refrigerant gas X1) compressed by the turbo compressor 5 is supplied to the condenser 2 through the flow path R1. The condenser 2 liquefies the compressed refrigerant gas X1. The condenser 2 is provided with a heat exchanger tube 2a through which cooling water flows, and cools and liquefies the compressed refrigerant gas X1 by heat exchange between the compressed refrigerant gas X1 and the cooling water. In addition, as such a refrigerant, a chlorofluorocarbon or the like can be used.

The compressed refrigerant gas X1 is cooled and liquefied by heat exchange between itself and the cooling water, thereby becoming a refrigerant liquid X2, and the refrigerant liquid X2 accumulates in a bottom portion of the condenser 2. The bottom portion of the condenser 2 is connected to the economizer 3 through a flow path R2. Further, the expansion valve 6 for decompressing the refrigerant liquid X2 is provided in the flow path R2. The refrigerant liquid X2 decompressed by the expansion valve 6 is supplied to the economizer 3 through the flow path R2.

The economizer 3 temporarily stores the decompressed refrigerant liquid X2 and separates the refrigerant into a liquid phase and a gas phase. A top portion of the economizer 3 is connected to an economizer connecting pipe 5b of the turbo compressor 5 through a flow path R3. A gas-phase component X3 of the refrigerant separated out by the economizer 3 is supplied to a second compression stage 12 (described later) through the flow path R3 without passing through the evaporator 4 and a first compression stage 11 (described later), and thus the efficiency of the turbo compressor 5 is increased. On the other hand, a bottom portion of the economizer 3 is connected to the evaporator 4 through a flow path R4. The expansion valve 7 for further decompressing the refrigerant liquid X2 is provided in the flow path R4. The refrigerant liquid X2 further decompressed by the expansion valve 7 is supplied to the evaporator 4 through the flow path R4.

The evaporator 4 evaporates the refrigerant liquid X2 and cools cold water by the heat of vaporization.

The evaporator 4 is provided with a heat exchanger tube 4a through which the cold water flows, and causes the cooling of the cold water and the evaporation of the refrigerant liquid X2 by heat exchange between the refrigerant liquid X2 and the cold water. The refrigerant liquid X2 evaporates by taking in heat by heat exchange between itself and the cold water, thereby becoming a refrigerant gas X4. A top portion of the evaporator 4 is connected to a gas suction pipe 5c of the turbo compressor 5 through a flow path R5. The refrigerant gas X4 having evaporated in the evaporator 4 is supplied to the turbo compressor 5 through the flow path R5.

The turbo compressor 5 compresses the refrigerant gas X4 having evaporated and supplies it to the condenser 2 as the compressed refrigerant gas X1. The turbo compressor 5 is a two-stage compressor which is provided with the first compression stage 11 which compresses the refrigerant gas X4, and the second compression stage 12 which further compresses the refrigerant compressed in one step.

An impeller 13 is provided in the first compression stage 11, an impeller 14 is provided in the second compression stage 12, and these impellers are connected by a rotating shaft 15. The turbo compressor 5 has a motor 10 and compresses the refrigerant by rotating the impeller 13 and the impeller 14 by the motor 10. Each of the impeller 13 and the impeller 14 is a radial impeller and radially leads out the refrigerant suctioned in an axial direction.

An inlet guide vane 16 for regulating the intake amount of the first compression stage 11 is provided in the gas suction pipe 5c. The inlet guide vane 16 is made to be rotatable such that an apparent area from a flow direction of the refrigerant gas X4 can be changed. A diffuser flow path is provided around each of the impeller 13 and the impeller 14, and the refrigerant led out in a radial direction is compressed and increased in pressure in the diffuser flow path. Further, it is possible to supply the refrigerant to the next compression stage by a scroll flow path provided around the diffuser flow path. An outlet throttle valve 17 is provided around the impeller 14 and can control the discharge amount from the gas discharge pipe 5a.

The turbo compressor 5 is provided with a hermetic type housing 20. The inside of the housing 20 is partitioned into a compression flow path space S1, a first bearing accommodation space S2, a motor accommodation space S3, a gear unit accommodation space S4, and a second bearing accommodation space S5.

The impeller 13 and the impeller 14 are provided in the compression flow path space S1. The rotating shaft 15 connecting the impeller 13 and the impeller 14 is provided to pass through the compression flow path space S1, the first bearing accommodation space S2, and the gear unit accommodation space S4. A bearing 21 supporting the rotating shaft 15 is provided in the first bearing accommodation space S2.

A stator 22, a rotor 23, and a rotating shaft 24 connected to the rotor 23 are provided in the motor accommodation space S3. The rotating shaft 24 is provided to pass through the motor accommodation space S3, the gear unit accommodation space S4, and the second bearing accommodation space S5. A bearing 31 supporting the anti-load side of the rotating shaft 24 is provided in the second bearing accommodation space S5. A gear unit 25, a bearing 26, a bearing 27, and an oil tank 28 are provided in the gear unit accommodation space S4.

The gear unit 25 has a large-diameter gear 29 which is fixed to the rotating shaft 24, and a small-diameter gear 30 which is fixed to the rotating shaft 15 and engaged with the large-diameter gear 29. The gear unit 25 transmits a rotating force such that the rotational frequency of the rotating shaft 15 increases with respect to the rotational frequency of the rotating shaft 24 (the speed of the rotating shaft 15 increases). The bearing 26 supports the rotating shaft 24. The bearing 27 supports the rotating shaft 15.

The oil tank 28 stores lubricating oil which is supplied to the respective sliding sites such as the bearing 21, the bearing 26, the bearing 27, and the bearing 31.

A sealing mechanism 32 and a sealing mechanism 33 which seal the periphery of the rotating shaft 15 are provided in the housing 20 between the compression flow path space S1 and the first bearing accommodation space S2. Further, a sealing mechanism 34 which seals the periphery of the rotating shaft 15 is provided in the housing 20 between the compression flow path space S1 and the gear unit accommodation space S4. Further, a sealing mechanism 35 which seals the periphery of the rotating shaft 24 is provided in the housing 20 between the gear unit accommodation space S4 and the motor accommodation space S3. Further, a sealing mechanism 36 which seals the periphery of the rotating shaft 24 is provided in the housing 20 between the motor accommodation space S3 and the second bearing accommodation space S5. Further, in the turbo refrigerator 1 of this embodiment, a sealing mechanism 40 which seals the periphery of the rotating shaft 24 between the bearing 26 and the gear unit 25 is provided in the gear unit accommodation space S4. The sealing mechanism 40 will be described in detail later.

The motor accommodation space S3 is connected to the condenser 2 through a flow path R6. The refrigerant liquid X2 is supplied from the condenser 2 to the motor accommodation space S3 through the flow path R6. The refrigerant liquid X2 supplied to the motor accommodation space S3 flows around the stator 22 and cools the motor accommodation space S3 by heat exchange between the stator 22 and the surroundings thereof. The motor accommodation space S3 is connected to the evaporator 4 through a flow path R7. The refrigerant liquid X2 having taken in heat in the motor accommodation space S3 is supplied to the evaporator 4 through the flow path R7.

The oil tank 28 has an oil feed pump 37. The oil feed pump 37 is connected to the second bearing accommodation space S5 through, for example, a flow path R8. The lubricating oil is supplied from the oil tank 28 to the second bearing accommodation space S5 through the flow path R8. The lubricating oil supplied to the second bearing accommodation space S5 is supplied to the bearing 31 and secures the lubricity of a sliding site of the rotating shaft 24 and simultaneously reduces (cools) generation of heat at the sliding site. The second bearing accommodation space S5 is connected to the oil tank 28 through a flow path R9. The lubricating oil supplied to the second bearing accommodation space S5 returns to the oil tank 28 through the flow path R9.

In the turbo refrigerator 1 of this embodiment having such a configuration, the compressed refrigerant gas X1 is cooled and condensed by the cooling water in the condenser 2, and the cooling water is heated, whereby heat is exhausted. The refrigerant liquid X2 produced by the condensation in the condenser 2 is decompressed by the expansion valve 6 and then supplied to the economizer 3, and after the gas-phase component X3 is separated out, the refrigerant liquid X2 is further decompressed by the expansion valve 7 and then supplied to the evaporator 4. The gas-phase component X3 is supplied to the turbo compressor 5 through the flow path R3.

The refrigerant liquid X2 supplied to the evaporator 4 evaporates in the evaporator 4, thereby taking the heat of the cold water and thus cooling the cold water. In this way, the heat of the cold water before cooling is substantially transported to the cooling water which is supplied to the condenser 2. The refrigerant gas X4 produced due to the evaporation of the refrigerant liquid X2 is supplied to the turbo compressor 5, thereby being compressed, and is then supplied to the condenser 2 again.

A portion of the refrigerant liquid X2 accumulated in the condenser 2 is supplied to the motor accommodation space S3 through the flow path R6. The refrigerant liquid X2 supplied to the motor accommodation space S3 through the flow path R6 cools the motor 10 accommodated in the motor accommodation space S3 and is then returned to the evaporator 4 through the flow path R7.

The lubricating oil flowing through the flow path R8 is supplied to the first bearing accommodation space S2, the second bearing accommodation space S5, and the gear unit accommodation space S4, thereby reducing the sliding resistance of the bearing 21, the gear unit 25, or the like.

Figure 2:
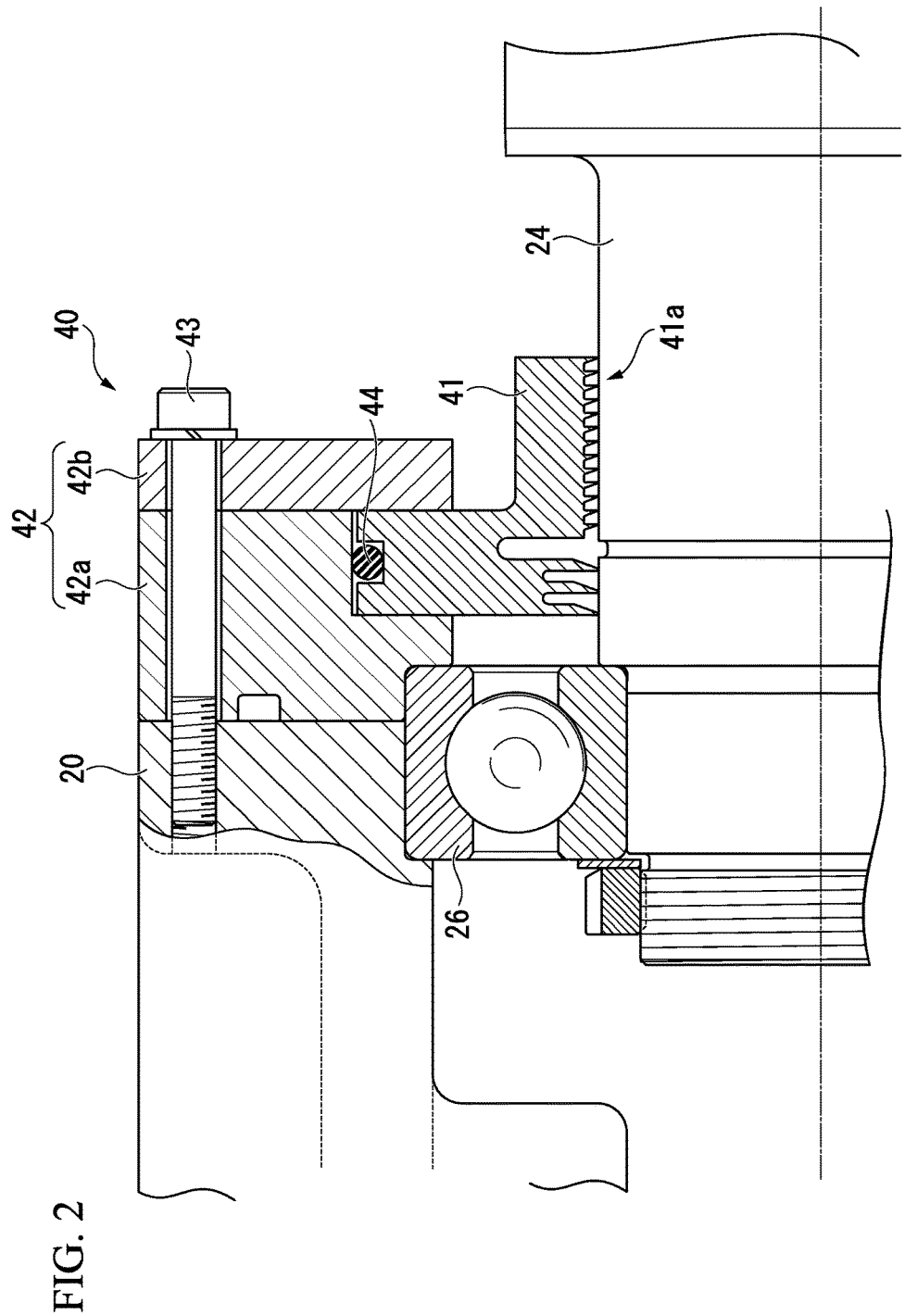
FIG. 2 is an enlarged view which includes a sealing mechanism which is provided in the turbo refrigerator in the embodiment of the present invention.

Next, the sealing mechanism 40 will be described in detail with reference to FIG. 2. FIG. 2 is an enlarged detailed view which includes the sealing mechanism 40. As shown in FIG. 2, the sealing mechanism 40 is provided with a sealing body 41, a sealing-body support part 42, a bolt 43, and an O-ring 44 (an elastic member).

The sealing body 41 is a ring-shaped member which surrounds the rotating shaft 24 when viewed from the axial direction, and is disposed on the side of the bearing 26 fixed to the housing 20, as shown in FIG. 2. The sealing body 41 has a labyrinth groove 41a at a portion facing the rotating shaft 24 and is disposed such that the labyrinth groove 41a faces the circumferential surface of the rotating shaft 24 with a slight gap therebetween.

The sealing-body support part 42 is composed of a ring-shaped base portion 42a which is brought into contact with the housing 20, and a ring-shaped cover portion 42b. The base portion 42a and the cover portion 42b are disposed concentrically to be centered on the axis of the rotating shaft 24 and sandwich the sealing body 41 therebetween from the axial direction of the rotating shaft 24. The contact surface between the base portion 42a and the sealing body 41 and the contact surface between the cover portion 42b and the sealing body 41 are sliding surfaces, and thus when a large external force acts on the sealing body 41 in a radial direction of the rotating shaft 24, the sealing body 41 becomes movable in the radial direction of the rotating shaft 24. The bolt 43 is inserted into the base portion 42a and the cover portion 42b and fastens these portions (that is, the sealing-body support part 42) to the housing 20.

The O-ring 44 is sandwiched between the sealing body 41 and the sealing-body support part 42 from the radial direction of the rotating shaft 24. That is, the O-ring 44 is interposed between the sealing body 41 and the sealing-body support part 42. The O-ring 44 surrounds the entire circumference of the sealing body 41 when viewed from the axial direction of the rotating shaft 24 and secures airtightness in the entire area of the gap between the sealing body 41 and the sealing-body support part 42. The O-ring 44 is an elastic member made of resin or the like which is deformable at the time of the assembling of the turbo refrigerator 1 or when an external force acts on the sealing body 41 in the radial direction of the rotating shaft 24.

In the turbo refrigerator 1 of this embodiment, the sealing body 41 surrounding the rotating shaft 24 is supported by the sealing-body support part 42 so as to be able to move in the radial direction of the rotating shaft 24 and the O-ring 44 which is an elastic member is interposed between the sealing body 41 and the sealing-body support part 42. The O-ring 44 can be flexibly deformed, and therefore, it is possible to easily adjust the position of the sealing body 41 with respect to the rotating shaft 24. Accordingly, it is possible to accurately perform the centering of the sealing body 41 with respect to the rotating shaft 24 by the O-ring 44, and it becomes possible to make the gap between the sealing body 41 and the rotating shaft 24 narrower than that in the related art. Further, according to the turbo refrigerator 1 of this embodiment, even in a case where the rotating shaft 24 comes into contact with the sealing body 41, impact due to the contact can be absorbed by the O-ring 44. Accordingly, it becomes possible to make the gap between the sealing body 41 and the rotating shaft 24 narrower than that in the related art. Therefore, according to the turbo refrigerator 1 of this embodiment, it becomes possible to improve sealing performance in the sealing mechanism 40.

Further, in the turbo refrigerator 1 of this embodiment, the labyrinth groove 41a is provided in the portion facing the rotating shaft 24, of the sealing body 41. For this reason, compared to a case where the labyrinth groove 41a is not provided in the portion facing the rotating shaft 24, of the sealing body 41, the shape of the gap between the sealing body 41 and the rotating shaft 24 becomes complicated, and thus it becomes possible to further improve the sealing performance.

Further, in the turbo refrigerator 1 of this embodiment, the O-ring 44 surrounds the entire circumference of the sealing body 41 when viewed from the axial direction of the rotating shaft 24. For this reason, it is possible to prevent gas from leaking out from the gap between the sealing body 41 and the sealing-body support part 42.

The preferred embodiment of the present invention has been described above with reference to the accompanying drawings. However, the present invention is not limited to the embodiment described above. The shapes, the combination, or the like of the respective constituent members shown in the embodiment described above is one example, and various changes can be made based on design requirements or the like within a scope of the present invention.

For example, in the embodiment described above, an example in which the sealing mechanism according to the present invention is applied to a turbo refrigerator has been described. However, the present invention is not limited thereto, and it is possible to apply the sealing mechanism according to the present invention to all devices in which it is necessary to seal the periphery of a rotating shaft.

Further, in the embodiment described above, a configuration in which the labyrinth groove 41a is provided in the portion facing the rotating shaft 24, of the sealing body 41 has been adopted. However, the present invention is not limited thereto, and it is also possible to adopt a configuration in which the labyrinth groove 41a is not provided in the portion facing the rotating shaft 24, of the sealing body 41.

INDUSTRIAL APPLICABILITY

According to the present invention, it is possible to improve sealing performance in a sealing mechanism which is disposed around a rotating shaft which is installed in a turbo refrigerator or the like.

REFERENCE SIGNS LIST

1: turbo refrigerator
2: condenser
2a, 4a: heat exchanger tube
3: economizer
4: evaporator
5: turbo compressor
5a: gas discharge pipe
5b: economizer connecting pipe
5c: gas suction pipe
6, 7: expansion valve
10: motor
11: first compression stage
12: second compression stage
13, 14: impeller
15, 24: rotating shaft
16: inlet guide vane
17: outlet throttle valve
20: housing
21, 26, 27, 31: bearing
22: stator
23: rotor
25: gear unit
28: oil tank
29: large-diameter gear
30: small-diameter gear
32, 33, 34, 35, 36, 40: sealing mechanism
37: oil feed pump
41: sealing body
41a: labyrinth groove
42: sealing-body support part
42a: base portion
42b: cover portion
43: bolt
44: O-ring (elastic member)
R1, R2, R3, R4, R5, R6, R7, R8, R9: flow path
S1: compression flow path space
S2: first bearing accommodation space
S3: motor accommodation space
S4: gear unit accommodation space
S5: second bearing accommodation space
X1: compressed refrigerant gas
X2: refrigerant liquid
X3: gas-phase component
X4: refrigerant gas

The invention claimed is:

1. A sealing mechanism comprising:
   a sealing-body support part which is fastened to a housing of a turbo compressor and surrounds a rotating shaft in the housing;
   a sealing body which is provided between the sealing-body support part and the rotating shaft, thereby surrounding the rotating shaft; and an elastic member which is sandwiched between the sealing body and the sealing-body support part and surrounds the sealing body, wherein the sealing-body support part is composed of a ring-shaped base portion which is brought into contact with the housing, and a ring-shaped cover portion;

the base portion and the cover portion sandwich the sealing body;

the contact surface between the base portion and the sealing body is a sliding surface;

the contact surface between the cover portion and the sealing body is a sliding surface; and the sealing body is able to move in a radial direction of the rotating shaft.

2. The sealing mechanism according to claim 1, wherein a labyrinth groove is provided in a portion facing the rotating shaft, of the sealing body.

3. The sealing mechanism according to claim 1, wherein the elastic member is an O-ring which surrounds the entire circumference of the sealing body when viewed from an axial direction of the rotating shaft.

4. A turbo refrigerator comprising:
a turbo compressor which has a rotating shaft connecting an impeller and a motor and performs compression of a refrigerant;
a condenser which condenses the refrigerant compressed in the turbo compressor;
an evaporator which evaporates the condensed refrigerant; and
a sealing mechanism which performs sealing of a periphery of the rotating shaft of the turbo compressor, wherein
the sealing mechanism is the sealing mechanism according to claim 1.

* * * * *